March 21, 1967 — R. WELLER — 3,309,773

DENTAL IMPLEMENT AND KIT

Filed May 7, 1964 — 2 Sheets-Sheet 1

INVENTOR
ROBERT WELLER
BY
ALAN K. ROBERTS
ATTORNEY

March 21, 1967 R. WELLER 3,309,773
DENTAL IMPLEMENT AND KIT
Filed May 7, 1964 2 Sheets-Sheet 2

INVENTOR
ROBERT WELLER
BY
ALAN K. ROBERTS
ATTORNEY

United States Patent Office 3,309,773
Patented Mar. 21, 1967

3,309,773
DENTAL IMPLEMENT AND KIT
Robert Weiler, 1932 Rockaway Parkway,
Valley Stream, N.Y. 11236
Filed May 7, 1964, Ser. No. 365,682
9 Claims. (Cl. 32—66)

This invention relates to dental implements and kits.

There has long been recognized in dentistry the desirability and, in fact, the necessity of repeatedly introducing between two adjacent teeth on an orthodontic arch wire a silk or elastic ligature for the purpose of performing orthodontic tooth movements.

It has also been recognized as very desirable for oral hygiene to introduce dental floss under the various teeth or pontic sections of fixed bridges (i.e., non-removable, permanently cemented restorations).

For the above purposes various devices have been heretofore improvised. For example, one clinical dental procedure is to twist a piece of thin wire on itself to create a small loop at one end into which the ligature or dental floss is threaded, the thusly constructed device being passed through the interdental space leading the ligature or floss therethrough.

Recently a commercial variation of this device has been developed with the view towards having dental patients maintain a superior oral hygiene under fixed bridgework. This variation consists of a flat celluloid oblong with a small hole at one end through which the ligature or floss is threaded, the device being passed through a denture space to lead the ligature of floss therethrough.

Both the aforesaid devices require the threading of the ligature or dental floss for each space to be negotiated. For the dentist this is repetitious, tedious and time consuming. For the patient this can be a difficult and exasperating task, depending on the individual's visual acuity and coordination.

A further disadvantage of the above devices resides in the difficulty of passing the same through prescribed areas without encountering and injuring the delicate tissues of the mouths of patients.

As to the above-noted wire device in particular, it is very difficult to hold and direct accurately. It is, moreover, very flexible and can be bent, distorted and deflected in use. Portions of this device, where the wire is twisted, can abrade soft tissues.

With particular reference to the celluloid device referred to above, this device is extremely small and is difficult to hold and direct with accuracy. Its edges may act as blades to lacerate gum tissues. Its extreme flexibility makes its passage through concealed areas a hit or miss affair and discourages regular use by patients. Moreover, the entire device must be passed through the space, leaving nothing to control its movement.

It is an object of the invention to provide an improved dental implement which is susceptible of use by both professionals and patients.

A more particular object of the invention is to provide an improved dental implement which eliminates the need for threading ligatures and dental floss through small openings.

Yet another object of the invention is to provide an improved dental implement, the use of which is both facile and simple even with respect to repeated applications.

In achieving the above and other of its objectives, the invention contemplates the provision of an instrument comprising a handle on which is supported a shank wherefrom extends a working loop which includes a heel portion connected to the aforesaid shank and a thrust portion intended to be directed through the space between adjacent teeth. Said thrust end is, moreover, provided with an engaging loop portion which may be turned inwardly or outwardly of the first said loop and in which the ligature or floss is intended to be engaged.

According to a feature of the invention, said engaging loop portion has a free end in the form of a beat whereby injurious penetration of the mouth tissues of the patient or user may be avoided.

According to a further feature of the invention, the dimensions of said thrust portion bear a particular relationship with the position of the related heel portion such as to enable the penetration of said thrust portion sufficiently through the space between adjacent teeth without there being interference between the teeth and the aforesaid heel portion.

According to yet a further feature of the invention, implements thereof can be provided in kits of modified construction whereby to facilitate dealing with the diffierent quadrants of the mouth.

Advantageously, the mounting of the aforeindicated working portion of the instrument on a relatively large handle permits either dentists or patients to control the implement, hold it without effort and to direct it with considerable accuracy. This renders unnecessary any great effort or coordination in the use thereof.

As a further advantage of the invention, only a thin, specially designed working end of an implement is passed between adjacent teeth and the entire device is never forced through, as is the case with presently employed instruments.

As still a further advantage of the invention, instruments provided in accordance therewith may be introduced by a dentist or patient from either the lip and cheek side of the teeth or from the tongue side of the teeth, whereas devices heretofore employed were usable only from the cheek and lip side as a practical matter.

The above objects, features and advantages of the invention will be apparent from the following detailed description of some preferred embodiments as illustrated in the accompanying drawing, in which.

Figure 1:
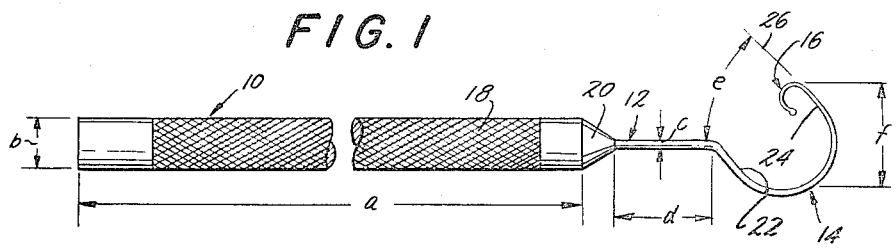
FIGURE 1 is a side view of an implement provided in accordance with one embodiment of the invention.

Before entering into the detailed description of the various embodiments of the invention, it should be noted that the implements illustrated in the drawings are susceptible of use individually according to requirements, but that alternatively these implements may be arranged in a kit, thereby greatly facilitating maneuvering relative to the different portions of the mouth.

Figure 2:
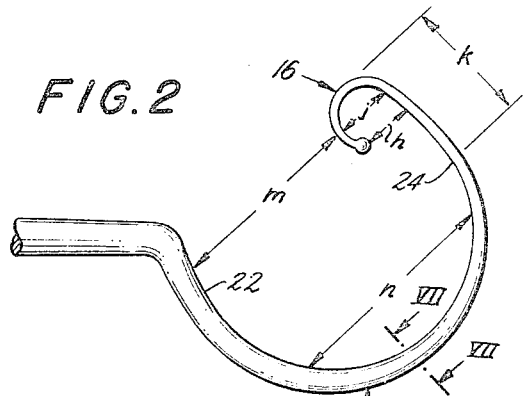
FIGURE 2 is a side view, on enlarged scale, of the working end of said implement.

The implement illustrated in FIGS. 1 and 2 is preferred for treating the frontal teeth and is designed such that the working end may be brought through the spaces between the frontal teeth, whereafter the ligature or dental floss may be engaged and the instrument withdrawn to draw the ligature or dental floss through the space between such frontal teeth.

The implement or instrument of FIGS. 1 and 2 comprises generally a handle portion 10, a shank portion 12, a working loop portion 14 and an engaging loop portion 16. Said implement is fabricated of any conventional dentally suitable metal which is preferably non-tarnishable, such as for example, stainless steel.

Said handle portion 10 is of a length $a$ having a practical range of 3 to 7 inches and a diameter or transverse dimension $b$ which is preferably of the order of magnitude of one-fourth to one-half of an inch. Handle 10 is provided with a knurled section 18 facilitating the grasping of the handle portion 10 by dentist or patient.

The shank 12 is connected to the handle portion 10 by a conical end portion 20 on the handle 10, the shank being a rigid portion having a length $d$ which is preferably in the order of about six to eight tenths of an inch, but which may vary within, for example, between the limits of one-half to 1 inch. The diameter $c$ of shank 12 will preferably taper away from the handle portion 10 between magnitudes of for example, one-tenth and five-one hundredths of an inch.

The handle portion 10 and the shank 12 are co-linearly aligned, these portions being coplanar with the working loop portion 14 which extends from the outer end of the shank 12.

Working loop portion 14 is attached to the shank by means of heel portion 22 and consists at its other extremity of a portion generally indicated at 24 and hereinafter referred to as the thrust portion of the working end portion.

The thrust portion 24 generally defines a line of thrust indicated at 26, this line preferably forming an angle $e$ with the shank portion 12 of at least about 60°. Thrust portion 24, moreover, terminates at a position having a distance $f$ from the base, distance $f$ lying within a range of from 0.48 to 0.60 inch.

An enlarged view of working loop portion 14 appears in FIG. 2, wherein it can be seen that the metal constituting this loop tapers continuously from heel portion 22 to thrust portion 24. The maximum diameter of the material constituting the working loop portion is preferably in the order of 0.02 inch, suitable tolerances being possible and a range of diameters being, for example, 0.03 to 0.01 inch.

The engaging loop portion 16, which extends from the thrust portion in reverse direction relative to the working loop portion (although actually curving in the same direction as the working loop portion), is provided with a free end having the form of a bead, the diameter of which lies between 0.03 and 0.02 inch. The provision of a bead avoids the possibility of penetrating the sensitive tissues of the mouth. Said bead is spaced from the thrust portion by a distance $h$ (less than $j$ below) which permits with ease the entry of the ligature or dental floss. The maximum dimension $j$ across the thrust portion 24 and loop portion 16, will lie within a range of from 0.02 to 0.04 inch, the maximum of this range permitting penetration through spaces of conventional sizes between various tooth structures.

The engaging loop portion 16 and thrust portion 24 cooperatively define a critical length $k$ representing the length of the instrument which will normally penetrate into and through the space between adjacent teeth. This is determined by the rectilinearity of loop portion 14 in the vicinity of thrust portion 24 or, in other words, is determined by where the curve of loop portion 14 is of sufficient magnitude as to limit the penetration of the free end thereof.

Dimensions $m$ and $n$ indicate the critical minimum spacing of heel portion 22 from thrust portion 24 in order to avoid engagement of heel portion 22 with the crowns of the teeth being processed when thrust portion 24 has penetrated the space therebetween. Dimensions $m$ and $n$ have a normal minimum of about 0.50 inch ($\pm 0.15$ inch) which will be sufficient to accommodate the sizes of teeth normally encountered. These dimensions correspond to dimension $f$ of FIGS. 1 and 2 and define a free space for accommodating a tooth structure.

Figure 4:
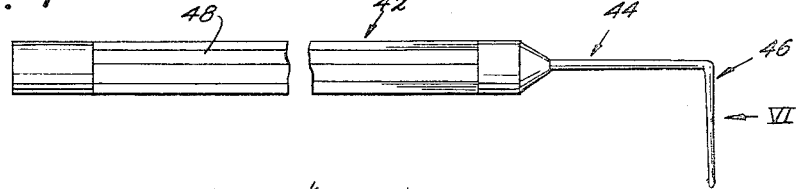
FIGURE 4 illustrates a further embodiment of the invention adapted for working a different quadrant of the mouth.
Figure 5:
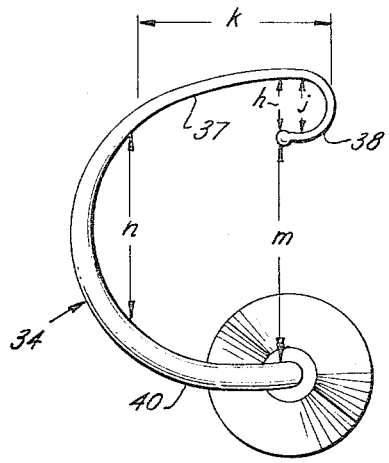
FIGURE 5 is a view of the instrument of FIG. 3 as seen in the direction of the arrow V in FIG. 3.

Whereas the implement of FIGS. 1 and 2 is intended for the frontal teeth, the implements of FIGS. 3-6 are intended for the side quadrants. The implement of FIGS. 3 and 5, similarly to embodiment described above, comprises a handle 30, a shank 32, and a working loop 34. Handle 30 is of hexagonal shape as indicated by facets 36. Working loop 34, rather than being coplanar with handle 30 and shank 32, is in a plane perpendicular to the axis of handle 30 and shank 32. Working loop 34 appearing on enlarged scale in FIG. 5 presents various of the dimensions previously established as being critical to the working loop. Thus for example, working loop 34 includes a thrust portion 37 which cooperatively with engaging loop 38 defines a critical distance $k$, said thrust portion being spaced from heel portion 40 as indicated by dimensions $m$ and $n$. These latter said dimensions will be such that heel portion 40 will not engage the crowns of teeth being processed with the thrust portion 37 being inserted therebetween.

Figure 6:
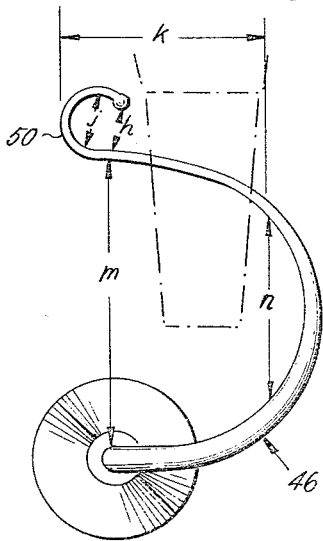
FIGURE 6 is a view of the working end of the implement of FIG. 4 on enlarged scale, and viewed in the direction of the arrow VI of FIG. IV.

The embodiment of FIGS. 4 and 6 similarly comprises a handle 42 and a shank 44 with a working loop 46 also at right angles to the handle and shank. Handle 42 is multi-faceted as indicated at 48 to facilitate grasping the handle.

FIG. 6 illustrates the working loop 46 which in this variation of the invention comprises an outwardly turned engaging loop 50 (curving in a direction opposite to that of the working loop 46) having dimensions $k$ and $j$ corresponding to those of FIGS. 2 and 5 and also further having dimensions $k$, $m$ and $n$ corresponding to those of FIGS. 2 and 5.

From what has been stated above, it will appear that the working loops of the invention share various features and dimensions in common, there being the substantial difference between these loops in that some are aligned perpendicularly of the associated handles whereas one is aligned in coplanar relationship therewith and in that the engaging loops may be turned inwardly or outwardly of the associated working loops.

In use the implements of the invention are employed such that the engaging loops and thrust portions are inserted between adjacent teeth either from the tongue side of the teeth to the lip or cheek side thereof or in the reverse direction whereafter a ligature or dental floss can be drawn between such teeth.

It will be readily appreciated that implements of the invention are readily maneuvered by dentists or patients and that the need for repetitious endwise threading of ligatures or dental floss is rendered unnecessary by the invention.

At the same time it will be appreciated that possibilities of injuring the soft tissue of the mounth is minimized since only a small specially designed working end is employed.

As noted above implements of the invention may be provided separately or in kit form. For example, it would be possible to make the above implements double ended with complementary working loops at opposite ends of the same handle.

Figure 7:
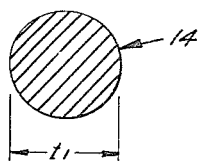
FIGURE 7 is a cross-sectional view taken along line VII in FIG. 2.
Figure 8:
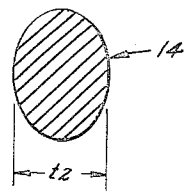
FIGURE 8 shows a variation of FIG. 7.

FIGS. 7 and 8 illustrate by way of example that, according to the invention, working loop portion may have a round or flattened cross-section, dimensions $t1$ and $t2$ lying within the aforesaid range of 0.03 to 0.01 inch.

Figure 9:
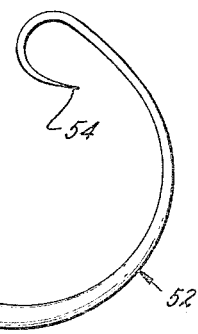
FIGURE 9 is a view corresponding to FIG. 2, illustrating a further embodiment.
Figure 3:
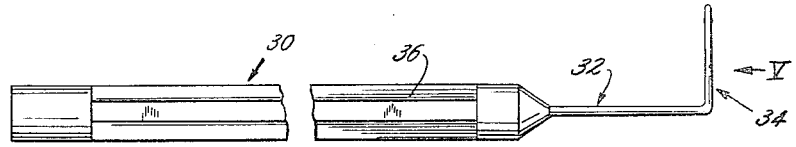
FIGURE 3 illustrates a further embodiment of the invention adapted particularly for working side portions of a particular quadrant of the mouth.

FIG. 9 illustrates still a further embodiment of the invention according to which a working loop portion 52 is provided with a pointed end 54 directed inwardly to avoid tissue damage.

There will now be obvious to those skilled in the art many modifications and variations of the structures herein described. These modifications and variations will not depart from the scope of the invention if defined by the following claims.

What is claimed is:

1. A dental implement for introducing ligatures or dental floss between teeth comprising a handle portion, a shank portion extending coaxially from said handle portion, and a working loop portion extending from said shank portion, said working loop portion defining a plane at least substantially coextensive with said handle and shank portions and including a free end portion constituting a thrust portion adapted to extend through an interdental space between adjacent teeth, said thrust portion being substantially rectilinear, said working loop portion including an engaging loop portion on said thrust portion and curving from the thrust portion in the same direction as the working loop portion, said engaging loop portion including a free end spaced from the thrust portion, said engaging loop portion having an inner diameter of about 0.02–0.04 inch, said working loop portion having a tapering cross-section and defining a free space of a transverse dimension of at least about 0.35 inch.

2. A dental implement comprising a handle portion, a shank portion extending coaxially from said handle portion, and a working loop portion extending from said shank portion, said working loop portion defining a plane at least substantially coextensive with said handle and shank portions and including a free end portion constituting a thrust portion adapted to extend through an interdental space between adjacent teeth, said thrust portion being substantially rectilinear, said working loop portion including an engaging loop portion on said thrust portion and curving from the thrust portion in the same direction as the working loop portion, said engaging loop portion including a free end in the form of a bead having a diameter of 0.02–0.03 inch and spaced from the thrust portion, said engaging loop portion having an inner diameter of about 0.02–0.04 inch, said working loop portion having a cross-section tapering from about 0.03–0.01 inch and defining a free space of a transverse dimension of about 0.35 to 0.65 inch, said shank portion having a length of about 0.6–0.8 inch and a tapering diameter of from about 0.1–0.05 inch.

3. A dental implement comprising a handle portion, a shank portion extending coaxially from said handle portion, and a working loop portion extending from said shank portion, said working loop portion defining a plane at least substantially coextensive with said handle and shank portions and including a free end portion constituting a thrust portion adapted to extend through an interdental space between adjacent teeth, said thrust portion being substantially rectilinear, said working loop portion including an engaging loop portion on said thrust portion and extending from the thrust portion, said engaging loop portion including a free end spaced from the thrust portion, said engaging loop portion having an inner diameter of about 0.02–0.04 inch, said working loop portion having a tapering cross-section and defining a free space of a transverse dimension of at least about 0.35 inch.

4. A dental implement comprising a handle portion, a shank portion extending coaxially from said handle portion, and a working loop portion extending from said shank portion, said working loop portion defining a plane at least substantially coextensive with said handle and shank portions and including a free end portion constituting a thrust portion adapted to extend through an interdental space between adjacent teeth, said thrust portion being substantially rectilinear, said working loop portion including an engaging loop portion on said thrust portion and curving from the thrust portion in the same direction as the working loop portion, said engaging loop portion including a free end in the form of a bead having a diameter of 0.02–0.03 inch, said engaging loop portion having an inner diameter of about 0.02–0.04 inch, said working portion having a cross-section tapering from about 0.03–0.01 inch and defining a free space of a transverse dimension of about 0.35 to 0.65 inch, said shank portion having a length of about 0.6–0.8 inch and a tapering diameter of from about 0.1–0.05 inch; said handle portion being about 3–7 inches long and having a diameter of about 0.25–0.50 inch; said handle portion including means to facilitate the gripping thereof.

5. A dental implement for introducing ligatures or dental floss between teeth comprising a handle portion, a shank portion extending from said handle portion, and a working loop portion extending from said shank portion, said working loop portion defining a plane at least substantially perpendicular to said handle and shank portions and including a free end portion constituting a thrust portion adapted to extend through an interdental space between adjacent teeth, said working loop portion including an engaging loop portion substantially smaller than said working loop portion extending from the thrust portion in reverse direction relative to the working loop portion, said engaging loop portion curving in the same direction as the working loop portion.

6. A dental implement comprising a handle portion, a shank portion extending coaxially from said handle portion, and a working loop portion extending from said shank portion, said working loop portion defining a plane at least substantially perpendicular to said handle and shank portions and including a free end portion constituting a thrust portion adapted to extend through an interdental space between adjacent teeth, said thrust portion being substantially rectilinear, said working loop portion including an engaging loop portion on said thrust portion and curving from the thrust portion in the same direction as the working loop portion, said engaging loop portion including a free end in the form of a bead spaced from the thrust portion, said engaging loop portion having an inner diameter of about 0.02–0.04 inch, said working loop portion having a tapering cross-section and defining a free space of transverse dimension of at least about 0.35 inch.

7. A dental implement comprising a handle portion, a shank portion extending coaxially from said handle portion, and a working loop portion extending from said shank portion, said working loop portion defining a plane at least substantially perpendicular to said handle and shank portions and including a free end portion constituting a thrust portion adapted to extend through an interdental space between adjacent teeth, said thrust portion being substantially rectilinear, said working loop portion including an engaging loop portion on said thrust portion and curving from the thrust portion in the same direction as the working loop portion, said engaging loop portion including a free end spaced from the thrust portion, said engaging loop portion having an inner diameter of about 0.02–0.04 inch, said working loop portion having a cross-section tapering from about 0.03–0.01 inch and defining a free space of a transverse dimension of about 0.35 to 0.65 inch, said shank portion having a length of about 0.6–0.8 inch and a tapering diameter of from about 0.1–0.05 inch.

8. A dental implement comprising a handle portion, a shank portion extending coaxially from said handle portion, and a working loop portion extending from said shank portion, said working loop portion defining a plane at least substantially perpendicular to said handle and shank portions and including a free end portion constituting a thrust portion adapted to extend through an interdental space between adjacent teeth, said thrust portion being substantially rectilinear, said working loop portion including an engaging loop portion on said thrust portion and curving from the thrust portion in the same direction as the working loop portion, said engaging loop portion including a free end in the form of a bead having a diameter of 0.02–0.03 inch and spaced from the thrust portion, said engaging loop portion having an inner diameter of about 0.02–0.04 inch, said working loop portion having a cross-section tapering from about 0.03–0.01 inch and defining a free space of a transverse dimension of about 0.35 to 0.65 inch, said shank portion having a length of about 0.6–0.8 inch and a tapering diameter of from about 0.1–0.05 inch; said handle portion being about 3–7 inches long and having a diameter of about 0.25–0.50 inch; said handle portion including means to facilitate the gripping thereof.

9. An implement as claimed in claim 8, wherein the cross-section of the working loop portion is circular.

References Cited by the Examiner

UNITED STATES PATENTS

| 473,035 | 4/1892 | Van Patten | 24—40 |
| 1,208,624 | 12/1916 | Newman | 119—152 |

FOREIGN PATENTS

| 320,831 | 10/1929 | Great Britain. |
| 56,929 | 8/1936 | Norway. |

ROBERT E. MORGAN, *Acting Primary Examiner.*

RICHARD A. GAUDET, *Examiner.*

J. W. HINEY, JR., *Assistant Examiner.*